United States Patent
Dingemans

(10) Patent No.: US 10,954,442 B2
(45) Date of Patent: Mar. 23, 2021

(54) ALL-AROMATIC HIGH-PERFORMANCE BLOCK-COPOLYMERS

(71) Applicant: Allotropica Technologies, Inc., Chapel Hill, NC (US)

(72) Inventor: Theodoras Jacobus Dingemans, Chapel Hill, NC (US)

(73) Assignee: Allotropica Technologies, Inc., Chapel Hill, NC (US)

( * ) Notice: Subject to any disclaimer, the term of this patent is extended or adjusted under 35 U.S.C. 154(b) by 24 days.

(21) Appl. No.: 16/089,327

(22) PCT Filed: Mar. 30, 2017

(86) PCT No.: PCT/NL2017/050197
§ 371 (c)(1),
(2) Date: Sep. 27, 2018

(87) PCT Pub. No.: WO2017/171547
PCT Pub. Date: Oct. 5, 2017

(65) Prior Publication Data
US 2019/0119574 A1    Apr. 25, 2019

(30) Foreign Application Priority Data

Mar. 30, 2016   (NL) ................................. 2016513

(51) Int. Cl.
| | | |
|---|---|---|
| *G02F 1/1333* | (2006.01) | |
| *C09K 19/38* | (2006.01) | |
| *C08G 63/06* | (2006.01) | |
| *C08G 63/12* | (2006.01) | |
| *C08G 63/78* | (2006.01) | |
| *C08G 73/16* | (2006.01) | |
| *C08G 69/12* | (2006.01) | |

(52) U.S. Cl.
CPC ........ *C09K 19/3809* (2013.01); *C08G 63/065* (2013.01); *C08G 63/12* (2013.01); *C08G 63/78* (2013.01); *C08G 69/12* (2013.01); *C08G 73/16* (2013.01); *C08G 2280/00* (2013.01); *C09K 2211/1433* (2013.01)

(58) Field of Classification Search
CPC ........ C09K 19/3809; C09K 2211/1433; G02F 1/1333; C08G 63/065; C08G 63/12; C08G 63/78; C08G 69/12; C08G 73/16; C08G 2280/00
USPC ...................................................... 252/299.6
See application file for complete search history.

(56) References Cited

U.S. PATENT DOCUMENTS

| | | |
|---|---|---|
| 4,351,917 A | 9/1982 | Calundann et al. |
| 4,619,975 A | 10/1986 | Matzner et al. |

FOREIGN PATENT DOCUMENTS

| | | |
|---|---|---|
| JP | S62116626 | 5/1987 |
| JP | H02102227 | 4/1990 |
| JP | 2004509190 | 3/2004 |
| WO | WO-02/22706 | 3/2002 |
| WO | WO-02/064661 | 8/2002 |

OTHER PUBLICATIONS

Guan et al., All aromatic (AB) n-multiblock copolymers via simple one-step melt condensation chemistry. Macromolecules. Nov. 2, 2016; (49)22: 8549-8562.*

* cited by examiner

*Primary Examiner* — Geraldina Visconti
(74) *Attorney, Agent, or Firm* — Morrison & Foerster LLP

(57) ABSTRACT

The invention is directed to a method for the preparation of a liquid crystal block copolymer, comprising melt polycondensation of a melt comprising at least two non-latent aromatic monomers and a latent aromatic monomer.

19 Claims, 4 Drawing Sheets

ALL-AROMATIC HIGH-PERFORMANCE BLOCK-COPOLYMERS

CROSS-REFERENCE TO RELATED APPLICATIONS

Figure 1:
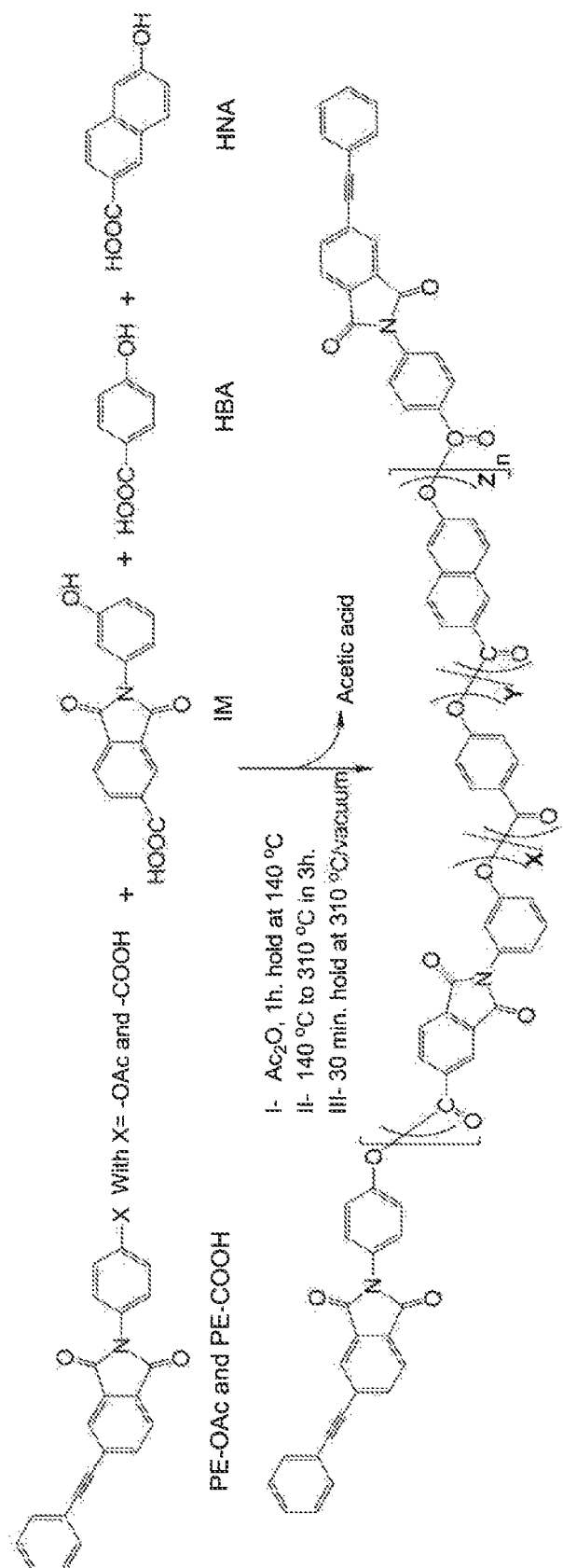

This application is the national phase of PCT application PCT/NL2017/050197 having an international filing date of 30 Mar. 2017, which claims benefit of Dutch patent application No. 2016513 filed 30 Mar. 2016. The contents of the above patent applications are incorporated by reference herein in their entirety.

The invention is in the field of high-performance polymers. The invention is in particular directed to high-performance block-copolymers and their preparation by melt polymerization, wherein the high-performance block-copolymers are preferably high-performance liquid crystal block-copolymers.

High-performance polymers (HPPs) are used in various applications in the aerospace, electronics and other industries. The term "high-performance" refers to the exceptional stability upon exposure to harsh environments and to properties that surpass those of commodity polymers. High-performance polymers are typically based on all-aromatic (heterocyclic) monomers, i.e. monomers having a high $sp^2$-bonding character and preferably comprising only a few or no weak $sp^3$-bonds. Conventional high-performance polymers, e.g. poly(4-oxybenzoate) and poly(6-oxy-2-naphthoate) have melting points ($T_m$) that are higher than the decomposition temperature ($T_{dec}$) and are typically poorly soluble. As such, they are therefore difficult to process.

To overcome some of the problems associated with conventional high-performance polymers, liquid crystal polymers (herein also referred to as LC polymers or LCPs) have been developed as high-performance polymers. LC polymers show lower melting points than their decomposition temperature and are therefore more easily processed. LCPs are HPPs capable of adopting highly ordered molecular arrangements while in solution or in the molten phase.

LCPs are generally prepared by polycondensation, which include melt polycondensation, solution polycondensation, solid-state polycondensation and the like. A preferred method is typically melt polycondensation since this method does not require the removal of solvents after the polycondensation is complete. In melt polycondensation, the polymerization takes place in a molten phase, i.e. molten reactants polymerize.

An example of a commercially available LCP prepared by polycondensation is Vectra®, based on randomly distributed 4-hydroxybenzoic acid and 6-hydroxynaphthalene-2-carboxylic acid.

In the field, it is believed that during melt polycondensation all reactants present in the melt have about the same reactivity. This principle is named the "equal reactivity principle". As a result, polycondensation of a melt comprising two or more monomers yields random copolymers, viz. the monomers are randomly distributed along the chain according to Bernoulli statistics. According to the equal reactivity principle, a selected molecular structure, e.g. sequences of specific monomer units along the chain (blocks), is hard to achieve since all steps in a condensation polymerization have equal rate constants. Preparation methods of selected molecular structures such as block copolymers are therefore currently generally based on laborious step-wise construction of the polymers that explicitly and separately prepare each of the blocks.

For instance, Hoffmann et al. describe in *High Perform. Polym.* 2004, 3-20 the preparation of $(AB)_n$-type block copolymers of polyether ether ketone (PEEK) and polysulfone (PSU), by separate preparation of PEEK and PSU oligomers and subsequent transesterification thereof. However, this process is cumbersome, difficult to reproduce and not broadly applicable.

Surprisingly, the present inventors have found that by using a latent monomer in melt polycondensation, liquid crystal block copolymers can very easily be obtained. This principle allows facile preparation of liquid crystal block copolymer, without the requirement of multiple steps, transpolymerization and/or chain extension.

Accordingly, a first aspect of the present invention is directed to a method for the preparation of a liquid crystal block copolymer, comprising melt polycondensation of a melt comprising at least two non-latent aromatic monomers and a latent aromatic monomer.

Since, all monomers of the copolymer are in the melt, the present melt polycondensation may be referred to as a one-pot melt polycondensation. Surprisingly, the one-pot melt results in (highly) organized polymeric block structures.

The terms "latent" and "non-latent" monomers indicate the relative reactivity of these monomers. The latent aromatic monomer (initially) reacts slower in the polycondensation than the non-latent aromatic monomers. Thus, at a low (initial) reaction temperature, the latent aromatic monomer is essentially unreactive, or at least much less reactive than the non-latent monomer. As further explained herein below, it is believed that the latent monomers are activated (i.e. they start to react in the polycondensation reaction) by an increase in temperature of the reaction mixture in the later stages of polycondensation.

The copolymers of the present invention preferably comprise more than 90%, preferably about 100% aromatic monomers. The latent aromatic monomer and non-latent aromatic monomers may herein also be referred to as latent and non-latent monomers, respectively.

Without wishing to be bound by theory, the present inventors believe that the liquid crystal (LC) block copolymer may be formed as follows. At the start of the polycondensation-due to the relatively high reaction rate of this non-latent monomer-oligomers (dimers, trimers and the like) are formed that mainly comprise the non-latent aromatic monomers. Subsequently, at an early stage of the polycondensation reaction, a phase separation of the non-latent aromatic monomer from the latent aromatic monomer in the melt may occur, which additionally prevents the reaction of the latent monomer with the non-latent monomer. As the temperature increases during the polycondensation, the latent aromatic monomer also starts to react and to form oligomers. However, due to the phase separation, latent aromatic monomers mainly react with other latent aromatic monomers while the non-latent aromatic monomers mainly react with other non-latent aromatic monomers. As such, blocks comprising most of the latent monomer (latent-monomer-rich blocks) and blocks comprising most of the non-latent aromatic monomer (latent-monomer-poor blocks) are formed. At a later stage of the polycondensation, when the temperature has further increased, condensation of A blocks with B blocks takes place forming the (AB)-comprising block copolymers or $(AB)_n$ multiblock copolymer.

The method is based on at least two non-latent aromatic monomers in combination with the latent aromatic monomer. As such, based on the above theory, the at least two non-latent aromatic monomers may form an anisotropic (liquid crystalline) melt phase, while the latent aromatic monomer may form an isotropic melt phase. The combination of anisotropic and isotropic melt phases is typically immiscible and believed to promote phase separation.

In a preferred embodiment, the latent aromatic monomer is non-mesogenic, meaning that it does not form a liquid crystal phase in the melt during the polycondensation. Typical non-mesogenic aromatic monomers are aromatic monomers that are not para-substituted on at least one of the aromatic moieties that comprise one or more groups that react in the polycondensation reaction. Thus, preferably, the latent aromatic monomer comprises an aromatic moiety that comprises at least two ortho- and/or meta-substituted substituents which comprise the groups that react in the polycondensation reaction. Without wishing to be bound by theory, the inventors believe that the preferred non-mesogenic nature of the latent aromatic monomer facilitates phase separation of the latent aromatic monomer from the non-latent aromatic monomer.

Vise versa, the non-latent aromatic monomers are preferably mesogenic, meaning that they form a liquid crystal phase in the melt during the polycondensation. Typical mesogenic aromatic monomers are aromatic monomers that are para-substituted on at least one, preferably all of the aromatic moieties that comprise one or more groups that react in the polycondensation reaction. Thus, preferably, the non-latent aromatic monomer comprises an aromatic moiety that comprises at least two para-substituted substituents which comprise the groups that react in the polycondensation reaction. Without wishing to be bound by theory, the inventors believe that the preferred mesogenic nature of the latent aromatic monomer facilitates phase separation of the latent aromatic monomer from the non-latent aromatic monomers.

By providing at least two mesogenic non-latent aromatic monomers in combination with at least one non-mesogenic latent aromatic monomer, particular good results are obtained. The preferred mesogenic nature of at least two the non-latent monomers are believed to result in an anisotropic melt of the non-latent monomers and their oligomers, while the preferred non-mesogenic nature of the latent monomer and its oligomers are believed to results in an isotropic phase. The presence of an anisotropic and an isotropic phase are believed to promote phase separation during the early stages of the polycondensation.

Crystallization of oligomers and/or polymers is typically to be minimized, preferably avoided, during the melt polycondensation, since crystallized oligomers/polymers can not further participate in the polymerization reactions. As such, it is required that at least two non-latent aromatic monomers having a different structure are present at the start of the polycondensation such that at the initial stage of the process, co-oligomers and/or copolymers of these non-latent aromatic compounds are formed.

The term "block" as used herein, refers to a polymeric substructure of any length. In the art of polymer technology, a long polymeric substructure is often referred to as a block, whereas a short subpolymeric structure is often referred to as a segment. Both these conventional meanings are understood to be comprised in the term "block".

The terms "polymer" and "copolymer" refer to polymeric structures of any length. In the art of polymer technology, a long polymeric structure is often referred to as a polymer, whereas a short polymeric structure is often referred to as an oligomer. Both these conventional meanings are understood to be comprised in the terms "polymer" and "copolymer".

The formation of the block copolymers may be attributed to the latent character of the latent monomer and to the phase separation of the A and B blocks. Phase separation is a phenomenon typically observed in blends of conventional polymers that consist of chemically different types of monomer. It is generally believed, however, that when two or more types of monomers are blended in a melt before their polymerization, monomers typically do not phase separate. As such, upon polycondensation of two or more types of monomers having equal reactivities, no blocks of the monomers are formed, rather statistical distributions thereof are obtained as described herein above. However, in the case that one of the monomers is a latent monomer, phase separation may occur since oligomers are formed of the other (faster reacting) monomer (herein referred to as non-latent aromatic monomers) and the physical properties of the non-latent aromatic oligomers differ from those of the latent monomer and its oligomers.

It has surprisingly been found that even liquid crystal block copolymers comprising polyester and/or a polyamide (polyesters, polyamides and poly(esteramide)s can be prepared in the method according to the present invention. LC block copolymers comprising polyester are believed to be particularly difficult to prepare due to the tendency of the polyester backbone to undergo transesterification, thereby possibly resulting in a random redistribution of monomers and blocks up to the point where the distinguishable blocks disappear and a statistical distribution of monomers results. However, without wishing to be bound by theory, it is believed that for the method of the present invention—the (early) phase separation—transesterification generally only takes place within each phase and block type and, as a result, no esterification occurs between phases and block types. As such, transesterification does typically not result in redistribution of the monomer and loss of the distinguishable blocks.

A particular embodiment of the present invention is therefore directed to the copolymer comprising copolyester, copolyamide or copoly(esteramide), wherein said aromatic monomers are each an aromatic monomer according to the formula $HO_2C$—Ar—X, wherein Ar is an aromatic group and X is an OH or $NH_2$.

In the embodiments that the aromatic monomers are according to the formula $HO_2C$—Ar—X, the degree of latency of the latent monomer may be expressed as the difference of its lowest $pK_a$ value (i.e. the $pK_a$ value of the carboxylic acid moiety) versus the lowest $pK_a$ value of the non-latent aromatic monomer. In a preferred embodiment, the lowest $pK_a$ value of the latent aromatic monomer is at least 0.5 lower than the lower $pK_a$ values of the non-latent aromatic monomer. The difference in the $pK_a$ values of the monomers may be determined by calculation with predictive software (e.g. Advanced Chemistry Development (ACD/Labs) Software V11.02).

Provided that the above-mentioned preferred difference of the lowest $pK_a$ values remains at least 0.5, the latent monomer preferably has a lowest $pK_a$ value in the range of 2 to 4, while the non-latent monomer has a lowest $pK_a$ value in the range of 4 to 6.

In a preferred embodiment of the present invention, the latent monomer comprises an electron withdrawing group positioned at the aromatic group. In a further preferred embodiment, the latent aromatic monomer has the structure of $HO_2C$—Ar-EWG, wherein Ar is a defined above and EWG is the electron withdrawing group. In this preferred embodiment, the hydroxyl (OH) or amine ($NH_2$) group may be positioned at the aromatic group or may be part of the electron withdrawing group. The presence of the electron withdrawing group is believed to result in the latency of the latent monomer.

Preferably, the latent aromatic monomer comprises one or more compounds having a structure according to HO$_2$C—Ar—X, wherein X is OH and/or NH$_2$ and Ar is selected from the group consisting of

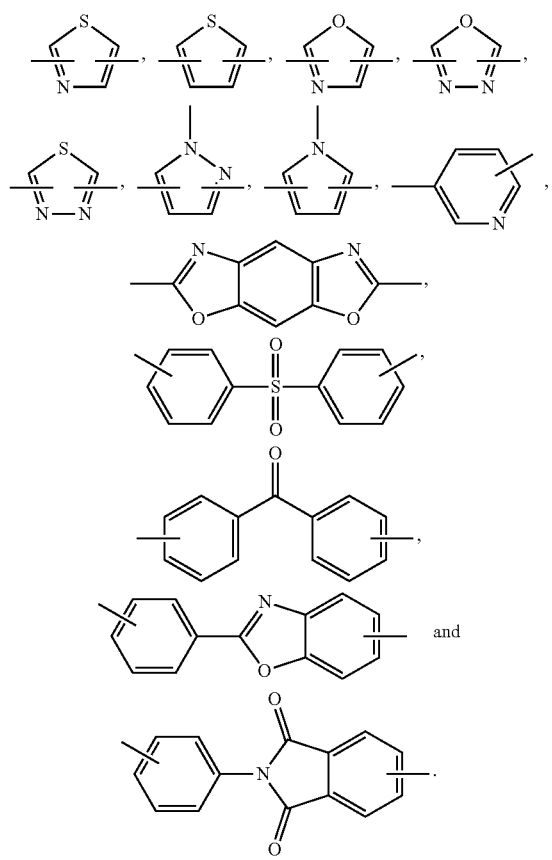

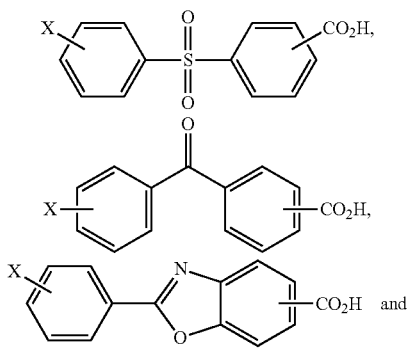

The presence of a heteroatom and/or carbonyl in the aromatic group is believed to contribute to the latency of the latent monomer. Additionally, it may increase the difference in polarity between the latent monomer and the non-latent monomer and aid in the phase separation as described above.

More preferably, the latent monomer is one or more compounds selected from the groups consisting of

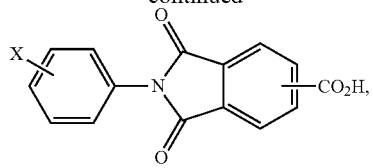

wherein X is OH or NH$_2$. The calculated pK$_a$ of each of these compounds is about 3.5.

Most preferably the latent monomer is one or more according to the structure

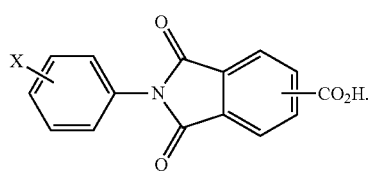

In the embodiment wherein the copolymer comprises a polyester and/or a polyamide, the non-latent aromatic monomers preferably comprises two or more compounds having a structure according to HO$_2$C—Ar—X, wherein X is OH and/or NH$_2$ and Ar is selected from the group consisting of

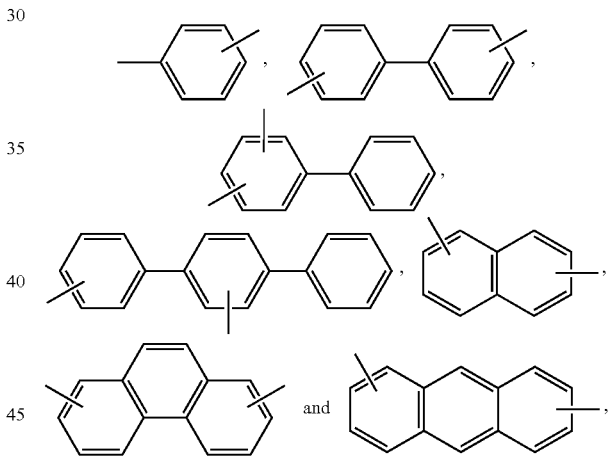

preferably from the group consisting of

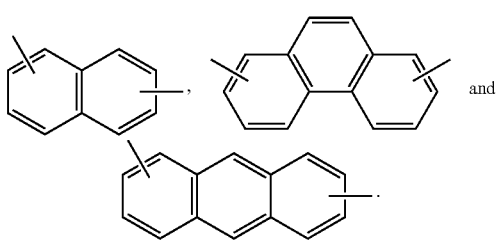

The calculated pK$_a$ of each of these compounds is about 4.5, which is significantly higher than the pK$_a$-values of the latent monomers.

For the present invention, mixtures of AB-, AA- and BB-type of monomers may be used. AA- and BB-type monomer comprise for instance two identical reactive groups, for instance two hydroxyls or two carboxylic acids. For instance, the non-latent monomer may comprise a mixture of monomers of the formula $HO_2C-Ar-CO_2H$ and X—Ar—X, wherein Ar and X are as defined herein-above.

Preferably, each monomer of the present invention, more preferably the latent monomer, typically comprises two different reactive groups, for instance a hydroxyl and a carboxylic acid as described herein-above. In the field, such monomers are also known as AB-type monomers. In theory, if no termination occurs, AB-type monomers could continue polymerization until a single polymer is formed. To control the degree of polymerization and the polymer lengths, end-cap compounds are often added to the melt.

In a preferred embodiment of the present invention, the melt further comprises one or more end-cap compounds.

In the particular embodiment wherein the aromatic monomers have the structure according to $X-Ar-CO_2H$, the endcap compounds preferably comprise a nucleophilic end-cap compound such as a hydroxyl-functionalized end-cap compound or an amine-functionalized end-cap compound and an electrophilic end-cap compound such as a carboxylic acid-functionalized end-cap compound. The nucleophilic end-cap compound preferably has a structure according to Ar—X and the electrophilic end-cap compound preferably has a structure according to $Ar-CO_2H$, wherein Ar is an aromatic group and X is OH or $NH_2$.

In the embodiments wherein the end-cap compounds are mainly present in one phase and thus mainly react with one type of block (either latent-monomer-rich blocks or latent-monomer-poor blocks), only one type of block may be end-capped. This may result in a LC triblock copolymer of the ABA-type. For instance, if the end-cap compounds are mainly present in the phase comprising the latent monomer, a LC ABA-triblock copolymer is formed wherein the A blocks comprise most of the latent monomer (i.e. the latent-monomer-rich blocks). By selecting the appropriate structure of the end cap compounds, it may be possible to control which of the monomers (latent or non-latent) react with the end cap. For instance, if the aromatic group in the end cap comprises a similar structure to the aromatic group in the latent monomer, it is likely that the end cap is present in the same phase as the latent monomer during polymerization. The same applies, mutatis mutandis, to the structure of the end cap and the structure of the non-latent aromatic monomers.

In a preferred embodiment, the end cap comprises an aromatic moiety selected from the group consisting of

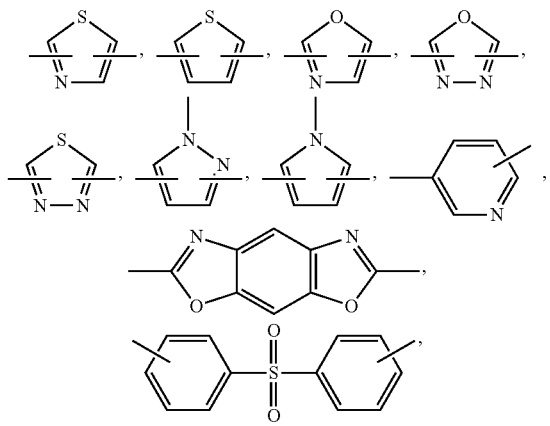

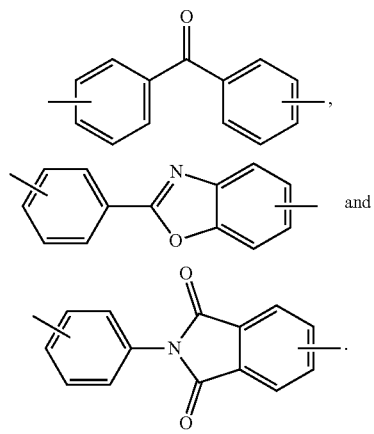

and/or from the group consisting of

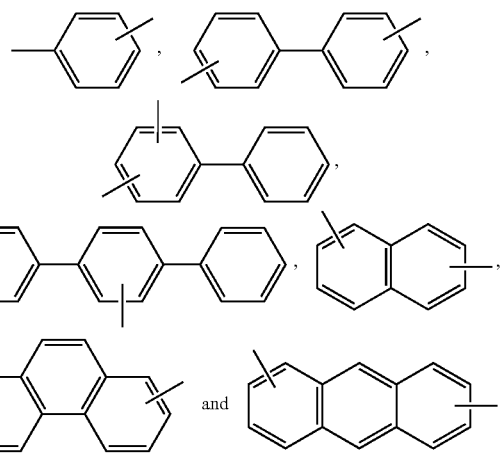

The end-cap compound preferably comprises reactive groups such that the end-capped LC block copolymers can react with each other to form a liquid crystal thermoset. The liquid crystal block copolymers are preferably end-capped with self-reactive end-groups, in which case the LC block copolymers may have a general structure of E-ABA-E, wherein ABA indicates the LC triblock copolymer and E the self-reactive end-group (hereinafter also referred to as the "self-reactive end-cap" or "reactive end-cap"). A self-reactive end-cap is capable of reacting with another self-reactive end-cap of the same type. Accordingly, an LC block copolymer with reactive end-caps is capable of chain-extension and/or crosslinking.

The end-cap compound preferably comprises a phenylacetylene, phenylmaleimide, or nadimide group as described in WO 02/22706, which is incorporated herein in its entirety. The reactive groups described in U.S. Pat. No. 9,145,519 (also incorporated herein in its entirety) may also be used in the end-cap compounds of the present invention.

Good results have been obtained using an end-cap compound according to the formula Ar—OH or $Ar-CO_2H$, wherein Ar is selected from the group consisting of

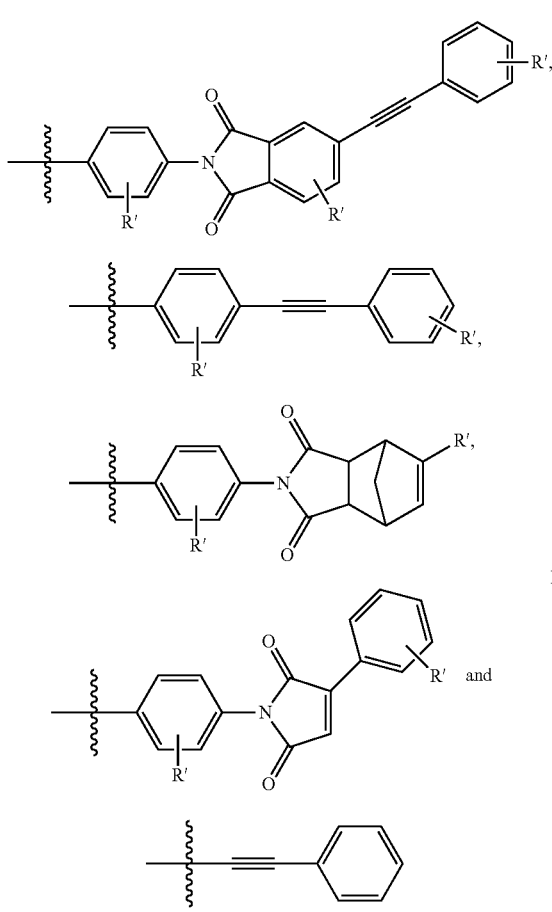

wherein R' is independently one or more hydrogen, alkyl groups containing six or less carbon atoms, aryl groups containing six or less carbon atoms, aryl groups containing less than ten carbon atoms, lower alkoxy groups containing six or less carbons, lower aryloxy groups containing ten or less carbon atoms, fluorine, chlorine, bromine or iodine. For example, R' may be H for all groups.

The melt polycondensation is typically carried out by increasing the temperature of the melt to compensate for the increase in melting point of the developing polymer and blocks and the increase in viscosity as well as to expedite the evaporation of volatile compounds (e.g. water and/or acetic acid) that are released during the polycondensation.

The melt polycondensation is typically facilitated by the addition of one or more anhydrides such as acetic anhydride. The anhydrides are converted into carboxylic acids (e.g. acetic anhydride is converted into acetic acid) during the polycondensation. The carboxylic acids are removed by evaporation. The melt polycondensation is typically carried out under an inert atmosphere (e.g. nitrogen and/or argon gas). At the final stages of the polycondensation, reduced pressure (vacuum) may optionally be applied to remove last traces of the carboxylic acid such as acetic acid.

The molar ratio of the latent monomer to the non-latent monomers may be between 10 and 0.1, preferably between 7 and 0.5, more preferably between 5 and 1. This ratio can influence the relative block lengths of the latent-monomer-poor and latent-monomer-rich blocks.

As described herein above, at least two non-latent aromatic monomers having a different structure are present at the start of the polycondensation to minimalize crystallization of oligomers and/or polymers. Therefore, the ratio between the two non-latent aromatic monomers is preferably at least 1:2.

Particularly good results have been obtained by melt polycondensation of N-(3'-hydroxyphenyl)trimellitimide (IM) as the latent monomer; 6-hydroxy-2-naphthoic acid (HNA) and 4-hydoxybenzoic acid (HBA) as the non-latent monomers. This particular melt polycondensation results in the LC block co-poly(esterimide) comprising (IM/HBA) blocks and (HNA/HBA) blocks.

Other good results have been obtained by melt polycondensation of N-(3'-hydroxyphenyl)trimellitimide (IM) as the latent monomer; 6-hydroxy-2-naphthoic acid (HNA) and 4-hydoxybenzoic acid (HBA) as the non-latent monomers and N-(4-carboxyphenyl)-4-phenylethynylphthalimide (PE-COOH) and N-(4-acetoxyphenyl)-4-phenylethynylphthalimide (PE-OAc) as end-cap compounds as illustrated in FIG. 1. This particular melt polycondensation results in the LC block co-poly(esterimide) approaching PE-(IM/HBA)$_n$-(HNA/HBA)$_m$-(IM/HBA)$_p$-PE, wherein n, m and p indicate the number of monomers per block.

It is preferred that the latent monomer comprises an imide-based core structure, while the non-latent monomers is free of an imide moiety. It is even more preferred that the aromatic group of the non-latent aromatic is a hydrocarbon. It is believed that this further promotes phase separation during the polycondensation as the non-latent monomer phase—during the polycondensation—only mainly comprises esters and hydrocarbons which do not blend well with the imide-based core structure of the latent monomer.

The present method provides an entry into LC block copolymers. A second aspect of the present invention is therefore the liquid crystal block copolymer comprising a non-latent aromatic monomer and a latent aromatic monomer, obtainable by the one-pot melt polycondensation as described herein. Such an LC block copolymer may thus be based on the latent and non-latent aromatic monomers described herein.

Figure 2:
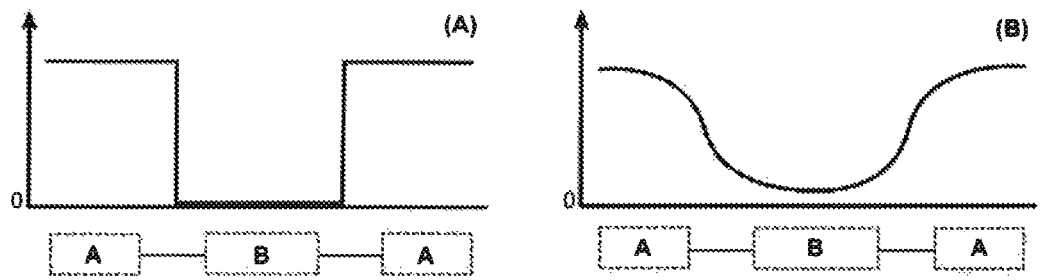

The LC block copolymer of the present invention more latent monomer in one block type (e.g. all A blocks) than in the other block type (e.g. B block). Preferably, all latent monomers are located in one block type (A or B), while all non-latent monomers are located in the other block type. However, some blending of the latent and non-latent monomers can typically not be avoided and the border between an A and a B block may not be as sharp as down to a single monomer. In FIG. 2 is illustrated the distribution and presence of the latent monomer (y-axis) per block (x-axis). Situation A schematically depicts a sharp crossing of blocks A and B, while situation B also schematically depicts block copolymers according to the present invention.

The distinct blocks in the block copolymer are particularly manifested by two distinct glass transition temperatures ($T_g$) of the LC block copolymer as determined by differential scanning calorimetry (DSC). The presence of two distinct glass transition temperatures is indicative of a phase separation.

Figure 4:
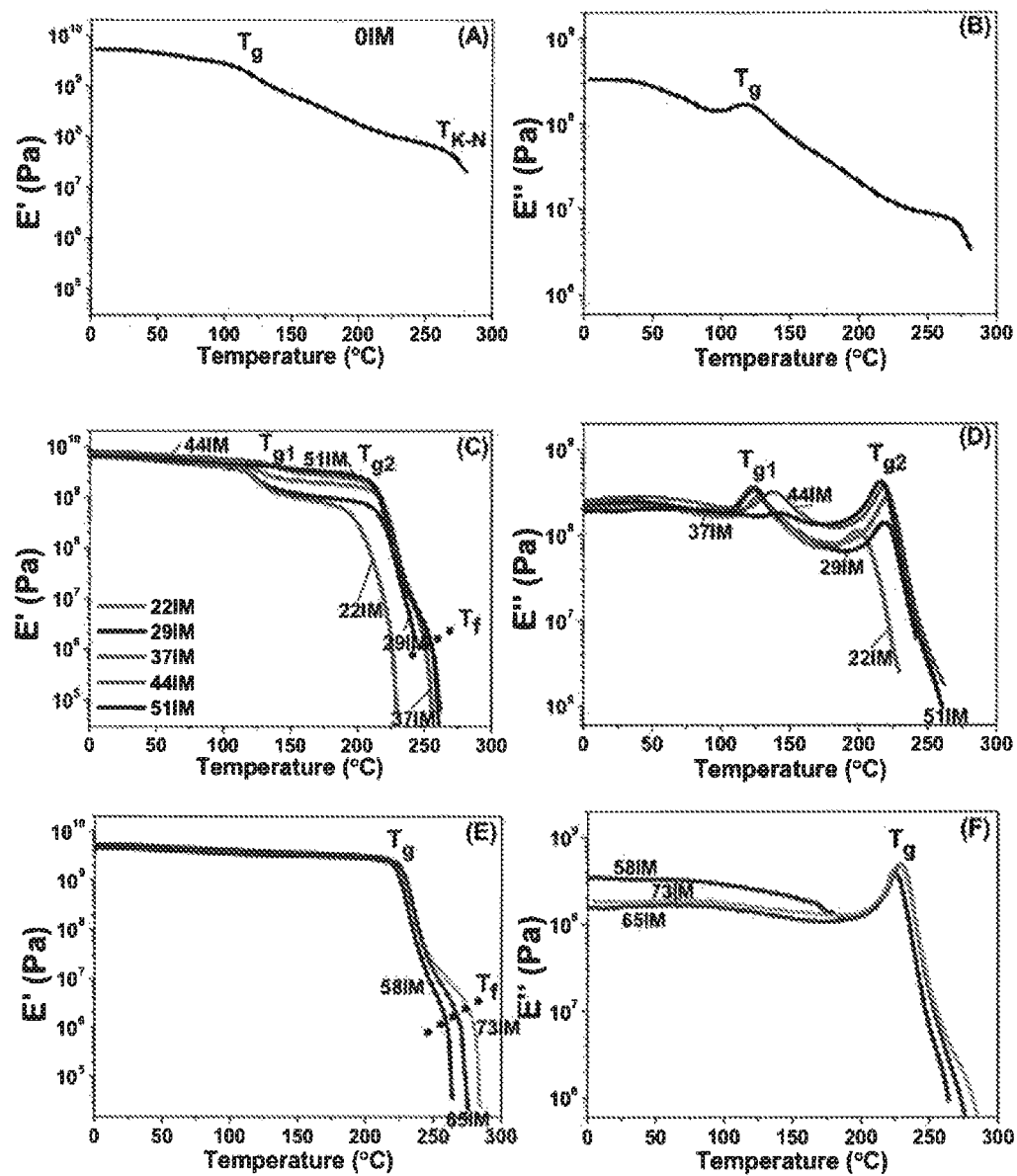

For instance, as shown in FIG. 4, LC block copolymers comprising the blocks (HNA/HBA) and (IM/HBA) have one $T_g$ of 110° C. and one $T_g$ of 220° C., which can be attributed to the HNA/HBA and IM/HBA blocks respectively.

To great advantage, the LC block copolymers of the present invention show high-temperature shape memory behavior.

In general, thermally responsive shape memory polymers have the ability to undergo a large recoverable deformation upon the application of an external thermal stimulus.

A further aspect of the present invention is therefore the use of the LC block copolymers for a recoverable deformation upon the application of an external thermal stimulus.

For the purpose of clarity and a concise description features are described herein as part of the same or separate embodiments, however, it will be appreciated that the scope of the invention may include embodiments having combinations of all or some of the features described.

The present invention may be illustrated with the following examples.

EXAMPLE 1

4-Hydroxybenzoic acid (4-HBA) and acetic anhydride were purchased from Aldrich (Zwijndrecht, The Netherlands). 6-Hydroxy-2-naphthoic acid (HNA) was purchased from Ueno Fine Chemicals Ltd and potassium acetate was purchased from Acros Organics (Geel, Belgium). 4-Phenylethynylphthalic anhydride (PEPA) was obtained from Hangzhou Chempro Tech Co., Ltd. The synthesis of the reactive end-groups, i.e. N-(4-carboxyphenyl)-4-phenylethynylphthalimide (PE-COOH) and N-(4-acetoxyphenyl)-4-phenylethynylphthalimide (PE-OAc) were prepared as described in Knijnenberger et al., *Macromolecules* 2006, 39, 6936-6943.

Synthesis of Latent Monomer N-(3'-hydroxyphenyl)trimellitimide (IM)

A 500 mL flask equipped with a mechanical stirrer and reflux condenser was charged with 250 mL glacial acetic acid and trimellitic anhydride (0.1 mol, 21.01 g). The mixture was heated to 120° C. and when all solids were dissolved, 3-aminophenol (0.1 mol, 10.91 g) was added. A thick suspension formed almost immediately and this reaction mixture was refluxed for 4 h at 120° C. After cooling the reaction mixture, the precipitated product was isolated by filtration and washed with acetic acid (2×) and ethanol (2×). The off-white N-(3'-hydroxyphenyl)trimellitimide (IM) was dried under vacuum at 140° C. for 24 h. Yield: 24.06 g. (0.085 mol, 85%); m.p. 304° C. (DSC). FTIR: the characteristic absorption peaks of imide groups were observed at 1777, 1715, 1383 and 725 cm$^{-1}$; the broad band around 3500 cm$^{-1}$ can be assigned to the phenolic hydroxyl group and carboxyl group. $^1$H NMR (DMSO-d$_6$, 400 MHz): δ 6.82-6.90 (m, 3H), 7.30 (t, 1H, J=8.2 Hz), 8.06 (d, 1H, J=7.7 Hz), 8.29 (s, 1H), 8.40 (dd, 1H, J=7.8, 1.1 Hz), 9.77 (s, 1H), 13.60 (s, 1H). $^{13}$C NMR (DMSO-d$_6$, 100 MHz): δ 114.30, 115.20, 117.73, 123.32, 123.66, 129.45, 131.93, 132.55, 134.80, 135.34, 136.32, 157.59, 165.74, 166.13, 166.15. MS m/z (relative intensity): 283.05 (100%) (M$^+$), 239 (20.7), 120 (30.6), 103.05 (27.8), 92 (46.1), 75 (32.1).

Synthesis of LC Poly(Esterimide)s and Reactive Oligomers.

A series of LC poly(esterimide)s based on IM, HBA and HNA as described in table 1 (entries 1-9) were synthesized using standard melt condensation techniques. The samples were labeled xxIM according to the feed ratio of IM in the polymerization, e.g. 22IM refers to a IM/HBA/HNA molar ratio of 0.22/0.51/0.27. An all ester-based reference polymer, with a HBA/HNA molar ratio of 0.73/0.27, was synthesized according to an identical procedure but without IM and labeled "0IM".

TABLE 1

| Sample | IM mol % | HBA mol % | HNA mol % |
|---|---|---|---|
| 0IM | 0 | 73 | 27 |
| 22IM | 22 | 51 | 27 |
| 29IM | 29 | 44 | 27 |
| 37IM | 37 | 36 | 27 |
| 44IM | 44 | 29 | 27 |
| 51IM | 51 | 22 | 27 |
| 58IM | 58 | 15 | 27 |
| 65IM | 65 | 8 | 27 |
| 73IM | 73 | 0 | 27 |
| 22IM-9K | 22 | 51 | 27 |
| 22IM-5K | 22 | 51 | 27 |

EXAMPLE 2

As a representative example, the synthesis of a 9000 g/mol block copolymer comprising reactive end-caps with a IM/HBA/HNA molar ratio of 0.22/0.51/0.27, 22IM-9K is described.

IM (0.22 mol, 61.988 g), HBA (0.51 mol, 70.533 g), HNA (0.27 mol, 50.809 g), PE-OAc (0.0187 mol, 7.137 g), PE-COOH (0.0187 mol, 6.873 g), and potassium acetate (0.1 mmol, 10 mg) were charged to a 500 mL three-neck round-bottom flask. The flask was equipped with a nitrogen gas inlet, an overhead mechanical stirrer, and a reflux condenser. The reactor was purged with nitrogen for 30 min prior to the start of the reaction and a slow nitrogen flow was maintained throughout the duration of the synthetic procedure. Acetic anhydride (113 mL, 1.2 mol) was added for the in-situ acetylation of the monomers. The reaction mixture was slowly stirred under a nitrogen atmosphere and heated to 140° C. to allow acetylation to take place. After a 1 h isothermal hold, the temperature of the reaction mixture was slowly increased to 310° C. using a heating rate of 1° C. min$^{-1}$. During this process acetic acid was collected as the polycondensation by-product. At 310° C. the nitrogen flow was stopped and a vacuum was applied to remove the residual acetic acid and other low molecular weight side products. The reaction flask was allowed to cool down overnight under a nitrogen flow and the final product was removed from the flask and processed into a powder. A solid-state post-condensation step was performed at 260° C. for 24 h under vacuum in order to remove all volatiles and ensure full polymerization. Yields for these syntheses were generally above 95%. The high molecular weight parent polymers were prepared under identical conditions but without PE-OAc and PE-COOH end-cap compounds.

EXAMPLE 3

Melt pressed thin films were prepared using standard melt pressing techniques. Post-condensed LC polyesterimide powder, prepared as described in examples 1 and 2, was placed between two Kapton™ films and consolidated in a preheated Joos hot press at 320° C. for 20 min with 5 kN force. The thermoset films were prepared from reactive oligomer powder under similar conditions but cured at 370° C. for 45 min Post-Treatment.

In order to understand the effect of post-treatment on properties such as the glass transition temperature (T$_g$) and storage modulus (E'), the thermoset films were heated from 25° C. to the predetermined temperature at a heating rate of 2° C. min$^{-1}$.

Characterization

The thermal properties of the LC poly(esterimide)s are summarized in table 2.

The thermal stability of the LC polymers and cured thermosets were evaluated using dynamic thermogravimetric analysis (TGA) at a heating rate of 10° C. min$^{-1}$. High decomposition values ($T_d^{5\%}$~450° C.) and high char yields (~65 wt %) were found, indicating that the dynamic thermal stability of this polymer series is comparable to that of commercially available high-performance polymers such as bismaleimide (BMI) and bisnadimide (PMR15). The char yield of the LC poly(esterimide)s is higher than that of 0IM (54 wt %), which results from the excellent thermal stability of the imide-based moiety (IM).

Figure 3:
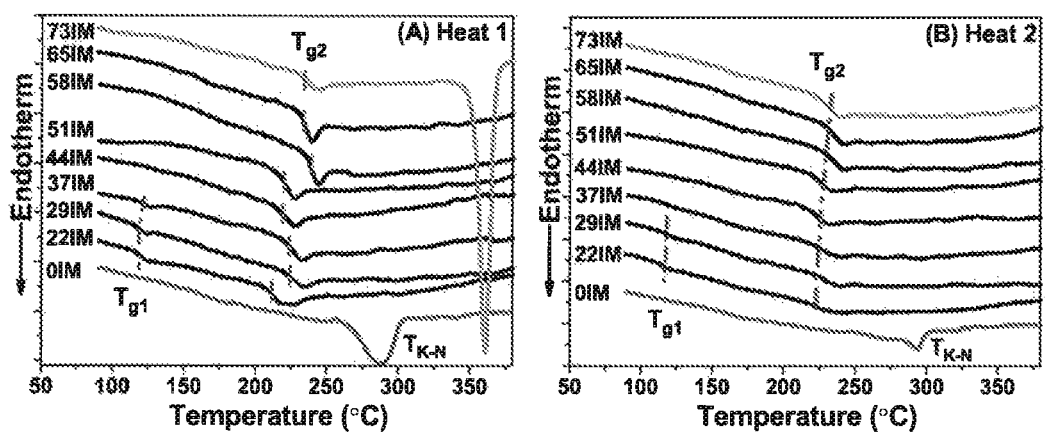

The thermal behavior of the LC polymers and reactive oligomers was investigated using differential scanning calorimetry (DSC). FIG. 3 depicts the first and second heating scans of the polymers using a heating rate of 20° C. min$^{-1}$. With regard to 0IM, no glass transition temperature ($T_g$) but a crystal-to-nematic transition ($T_{K-N}$) at 283° C. is observed. All LC poly(esterimide)s show high $T_g$'s at 210-230° C.

In order to explore the thermomechanical properties of the LC poly(esterimide)s, the storage modulus (E') and loss modulus (E") as function of temperature were studied using dynamic mechanical thermal analysis (DMTA). The thin films as prepared in Example 3 were used for these DMTA experiments and the results are provided in FIGS. 4, 5 and 6 as well as in table 2.

In FIG. 4, results of the DMTA analysis of the LC poly(esterimide)s 22IM-73IM melt pressed films are provided. Storage modulus (E') and loss modulus (E") as function of temperature for 0IM (A, B), the polymers with [IM]≤51 mol % (C, D) and the polymers with [IM]≥58 mol % (E, F). Heating rate 2° C. min$^{-1}$/nitrogen atmosphere and a frequency of 1 Hz.

Figure 5:
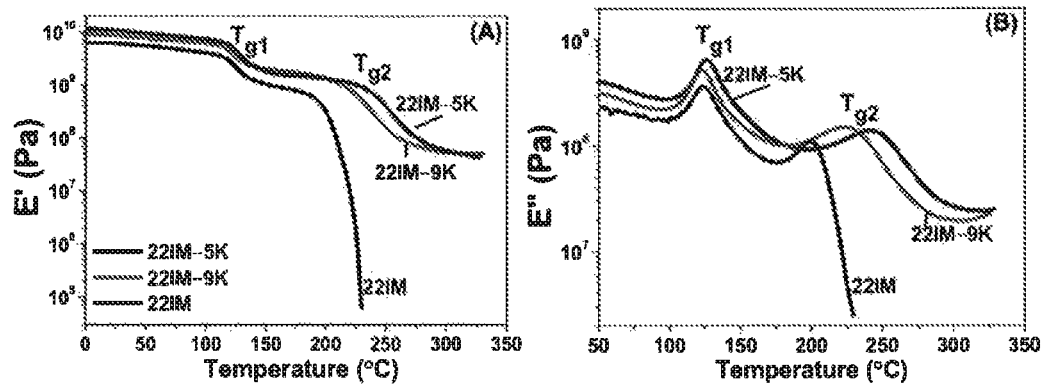

In FIG. 5, results of the DMTA analysis of the LC poly(esterimide)s comprising reactive end-caps (22IM-5K and 22IM-9K) as well as the LC poly(esterimide)s 22IM as comparison are provided. Storage moduli (E') (A) and loss moduli (E") (B) as function of temperature for the 22IM parent polymer and cured thermoset films thereof. Heating rate 2° C. min$^{-1}$/nitrogen atmosphere and a frequency of 1 Hz.

Figure 6:
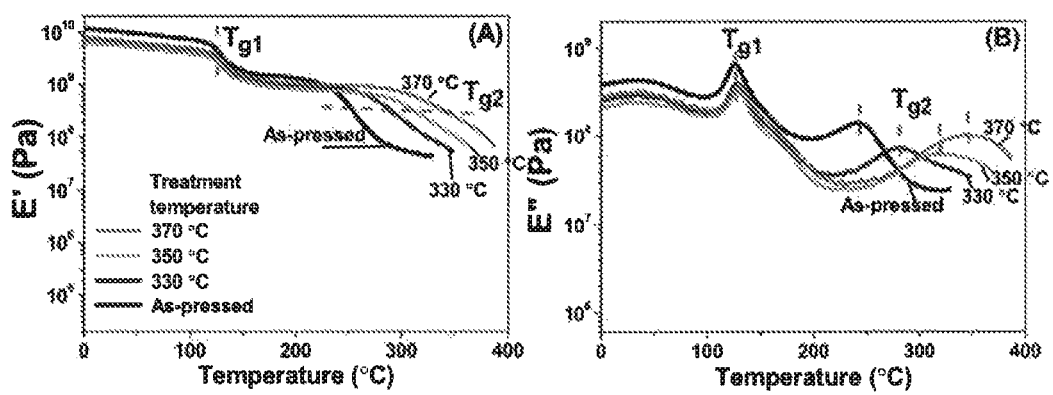

In FIG. 6, results of the DMTA analysis of the LC poly(esterimide)s comprising reactive end-caps 22IM-5K after post-processing are provided. Storage moduli (E') (A) and loss moduli (E") (B) for 22IM-5K films after different post-treatment temperatures are shown. Heating rate 2° C. min$^{-1}$/nitrogen atmosphere and a frequency of 1 Hz. The films were post-treated from 25° C. to the predetermined temperatures with a heating rate 2° C. min$^{-1}$/nitrogen atmosphere and immediately cooled down to 25° C. (cooling rate ~3° C. min$^{-1}$).

TABLE 2

| Sample | $T_{K-N}$ (° C.)$^a$ | $T_{g1}$ (° C.) DSC$^b$ | $T_{g2}$ (° C.) DSC$^b$ | $T_{g1}$ (° C.) DMTA$^c$ | $T_{g2}$ (° C.) DMTA$^c$ | E' at 25° C. (GPa) | $T_d^{5\%}$ (° C.)$^d$ | Char yield (wt %)$^e$ |
|---|---|---|---|---|---|---|---|---|
| 0IM | 280 | — | — | 111 | — | 5 | 480 | 54 |
| 22IM | 280 | 120 | 222 | 124 | 200 | 6 | 450 | 63 |
| 29IM | 300 | 119 | 229 | 124 | 220 | 6 | 449 | 65 |
| 37IM | 310 | 121 | 226 | 129 | 221 | 7 | 447 | 65 |
| 44IM | 300 | — | 221 | 139 | 219 | 8 | 445 | 63 |
| 51IM | 300 | — | 225 | 143 | 216 | 7 | 448 | 65 |
| 58IM | 290 | — | 233 | — | 224 | 5 | 453 | 64 |
| 65IM | 290 | — | 234 | — | 230 | 5 | 448 | 65 |
| 73IM | 300 | — | 235 | — | 228 | 5 | 446 | 66 |
| 22IM-9K | 280 | 118 | 250 | 123 | 225 | 8 | 458 | 63 |
| 22IM-5K | 270 | 118 | 254 | 127 | 243 | 10 | 458 | 64 |

$^a T_{K-N}$ values were obtained from a hot-stage optical microscopy study. Heating rate 50° C. min$^{-1}$/air atmosphere.
$^b T_g$ values were obtained from the second heating scan of DSC experiments. Heating rate 20° C. min$^{-1}$/nitrogen atmosphere.
$^c$ Tg data were obtained from DMTA experiments using melt pressed films, defined by the maximum of the loss modulus (E") peak. Heating rate 2° C. min$^{-1}$/nitrogen atmosphere and a frequency of 1 Hz.
$^d$ Thermal stability was evaluated using dynamic TGA. The sample was isothermal held at 370° C. for 1 h. before the actual measurement. Heating rate 10° C. min–1/nitrogen atmosphere.
$^e$ Char yield at 600° C.

The invention claimed is:

1. A method for the preparation of a liquid crystal block copolymer, comprising melt polycondensation of a melt comprising at least two non-latent aromatic monomers and a latent aromatic monomer.

2. The method of claim 1, wherein the copolymer comprises a polyester and/or a polyamide and said latent and non-latent aromatic monomers are each according to the formula HO$_2$C—Ar—X, including salts and derivatives thereof, wherein Ar is an aromatic group and each X is OH or NH$_2$.

3. The method of claim 1, wherein the latent aromatic monomer comprises a six-member aromatic group that comprises an electron withdrawing group at a meta, ortho, and/or para position of the six-member aromatic group.

4. The method of claim 1, wherein the lowest pK$_a$ value of the latent aromatic monomer is at least 0.5 pH units lower than the lower pK$_a$ values of the non-latent aromatic monomers.

5. The method of claim 1, wherein the non-latent aromatic monomers have a structure according to HO$_2$C—Ar—X, including salts and derivatives thereof, wherein each X is OH or NH$_2$ and Ar is selected from the group consisting of

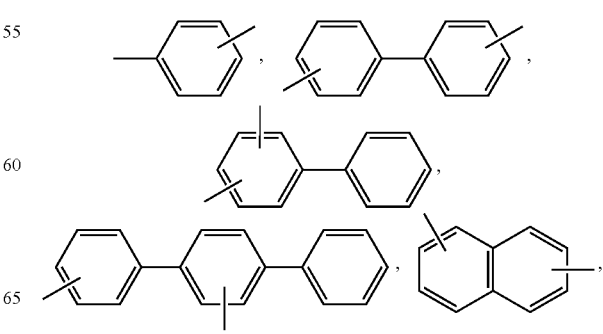

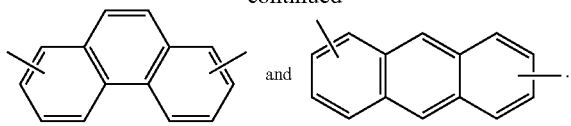

6. The method of claim 1, wherein the latent aromatic monomer has a structure according to HO$_2$C—Ar—X, including salts and derivatives thereof, wherein each X is OH or NH$_2$ and Ar is selected from the group consisting of

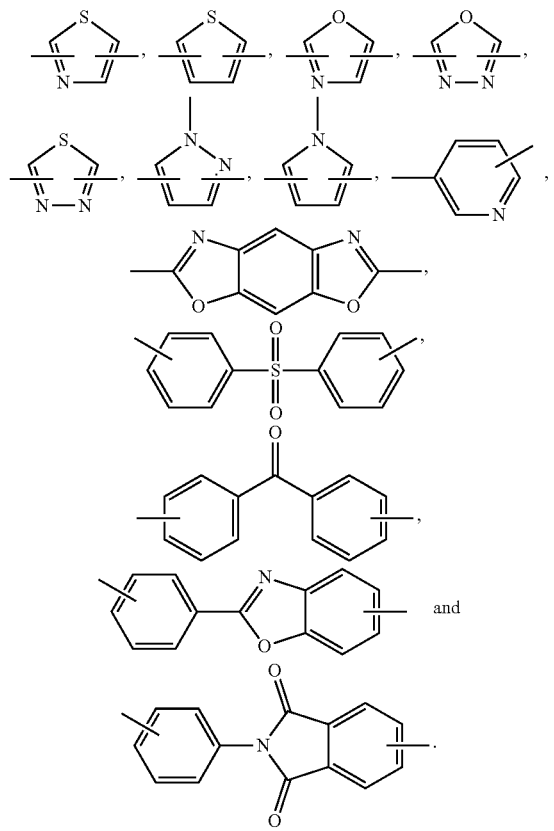

7. The method of claim 1, wherein the latent monomer comprises one or more compounds selected from the groups consisting of

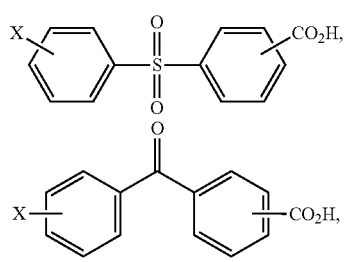

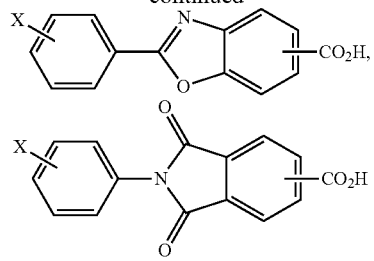

and salts and derivatives thereof, wherein X is OH or NH$_2$.

8. The method of claim 1, wherein the melt further comprises end-cap compounds.

9. A liquid crystal block copolymer comprising blocks A and B comprising non-latent aromatic monomers and a latent aromatic monomer obtainable by the method of claim 1.

10. The liquid crystal block copolymer of claim 9, wherein the A blocks comprise more latent monomer than non-latent monomer and B blocks comprise more non-latent monomer than latent monomer.

11. The liquid crystal block copolymer of claim 9, further comprising an end-cap compound.

12. The liquid crystal block copolymer of claim 9, wherein the liquid crystal block copolymer is a liquid crystal ABA-triblock copolymer.

13. The liquid crystal block copolymer of claim 9, having two glass transition temperatures.

14. A liquid shape memory material for a recoverable deformation upon the application of an external thermal stimulus which comprises the crystal block copolymer of claim 9.

15. The method of claim 5, wherein each X is OH or NH$_2$ and Ar is selected from the group consisting of

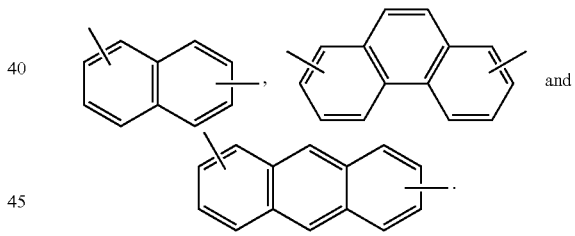

16. The method of claim 8, wherein the melt further comprises a nucleophilic end-cap compound and an electrophilic end-cap compound.

17. The method of claim 16, wherein the nucleophilic end-cap compound has the structure Ar—X, including salts and derivatives thereof, and the electrophilic end-cap compound has the structure Ar—CO$_2$H, including salts and derivatives thereof, wherein Ar is an aromatic group.

18. The method of claim 17, wherein said Ar comprises the aromatic group that is also present in the latent aromatic monomer or in the non-latent aromatic monomer.

19. The liquid crystal block copolymer of claim 11, wherein said end-caps are reactive end-caps.

* * * * *